United States Patent [19]

Georgiou et al.

[11] Patent Number: 4,845,704

[45] Date of Patent: Jul. 4, 1989

[54] SWITCHING SYSTEM FOR INTEGRATED VOICE/DATA COMMUNICATIONS

[75] Inventors: Christos J. Georgiou, White Plains, N.Y.; Gerald Lebizay, Vence, France

[73] Assignee: International Business Machines Corporation, Armonk, N.Y.

[21] Appl. No.: 33,437

[22] Filed: Apr. 1, 1987

[51] Int. Cl.⁴ .......................................... H04Q 11/04
[52] U.S. Cl. ........................................ 370/58; 370/60; 340/825.79
[58] Field of Search .................. 370/60, 58, 64, 94, 370/84; 379/284; 340/825.79

[56] References Cited

U.S. PATENT DOCUMENTS

| | | | |
|---|---|---|---|
| 3,766,322 | 10/1973 | Moffett et al. | 370/60 |
| 4,413,337 | 11/1983 | Dauphin et al. | 370/94 |
| 4,520,477 | 5/1985 | Wen | 370/58 |
| 4,543,652 | 9/1985 | Armada et al. | 370/58 |
| 4,581,735 | 4/1986 | Flamm et al. | 370/60 |
| 4,630,045 | 12/1986 | Georgiou | 379/284 |
| 4,635,250 | 1/1987 | Georgov | 370/58 |
| 4,656,622 | 4/1987 | Lea | 370/60 |
| 4,670,626 | 6/1987 | Fisher et al. | 370/58 |
| 4,695,999 | 9/1987 | Lebizay | 370/58 |
| 4,704,716 | 11/1987 | Bowers et al. | 370/58 |

Primary Examiner—M. H. Paschall
Attorney, Agent, or Firm—Douglas W. Cameron

[57] ABSTRACT

A method of integrating the switching of voice and data between terminals connected to switch adapters. The switching of voice (or more generally synchronous signals) is accomplished by grouping voice samples in a first adapter and bound for the same destination or second adapter into a frame. Connections are then established between the two adapters and the frame is transmitted therethrough. A duplex method can also be set up by transmitting in both directions at the same time once a dual connection between the first and second adapter is established. Hence, a second group of voice samples bound for the first adapter is also formed ina frame. The two frames are then transmitted simultaneously in opposite directions through a dual connection in the switching matrix. Data is switched by storing data in respective memories of respective adapters, wherein each respective memory corresponds to a particular adapter to which the data stored therein is to be sent.

5 Claims, 8 Drawing Sheets

← 64×32   ONE SIDED CROSSPOINT
SWITCHING MATRIX

FIG. 7
FRAME OF VOICE SAMPLES
(BOUND FOR A GIVEN DESTINATION ADAPTER)

FIG. 8

SWITCHING SYSTEM FOR INTEGRATED VOICE/DATA COMMUNICATIONS

TECHNICAL FIELD

This invention relates to a method of switching voice and data using time and space division multiplexing. More specifically, this invention effects high-capacity integrated voice and data switching by grouping voice data bound for the same destination into a frame, and storing packet data bound for the same destination into a packet memory location. The frame and stored data are then transmitted through the switching matrix.

DESCRIPTION OF THE PRIOR ART

With the recent growth in the use of computers, there has been an increase in demand for data. Much of this demand also comes from terminal locations which also have a need for the transmission of voice or more broadly, a need for synchronous transmission. Thus, there is a demand for the integrated switching of voice and data. Various schemes for the switching of voice and data have been developed. The most recent of which are time division switching schemes or combination of time and space switching schemes. However, as will be described below, these methods provide low capacity integrated voice and data switching with high costs and poor growth potential. One system for integrating the switching of circuit and packet data using both time and space switching is described in U.S. Pat. No. 3,766,322 to Moffet et al. The system described therein uses a number of crosspoint switching matrices for the space switching, with one dedicated matrix to each data-rate category being switched. Both circuit and packet data can be transmitted through the same matrix if they are of the same data rate. Also, individual time division switches, dedicated to each data rate being switched, are used to perform the time switching. The system described in Moffet et al is a relatively low speed and hence low capacity system. It can also be seen that any attempt to increase the number of switched data rate categories using an apparatus of the type described in Moffet would result in a complex apparatus involving a large number of individual time and space switches. This complexity is a result of the need to dedicate a time and a space switch to each data rate category. To grow with increased demand, even without increasing the number of data rate categories, could also require a number of space and time switches because of the need to dedicate individual facilities for each data rate category. Thus the Moffet switching system, by requiring a number of dedicated matrices and time switches, makes system growth relatively difficult and facility cost high. Another switching mechanism for both circuit and packet switching is disclosed in U.S. Pat. No. 4,413,337, to Dauphin et al. This mechanism uses only time division switching and not space division switching. Thus, the system disclosed therein offers a relatively low capacity system servicing in the vicinity of up to 256 64 kbit/sec circuit channels.

Consequently, a need exists for a method of switching both voice and data in an integral fashion which can service a relatively large number of terminals (i.e., in the neighborhood of, say sixteen thousand 64 kbit/sec terminals) with low cost and high growth potential.

SUMMARY OF THE INVENTION

This invention provides a method of integrating the switching of synchronous signals and data to satisfy the aforementioned needs. The invention embodies a method of switching between terminals with low cost, high capacity and high growth potential.

Accordingly, the present invention relates to a method of switching signals through a switching matrix. The method generally uses a single matrix and a single controller. The matrix is connected to a plurality of switch adapters through input-output lines of the matrix. The switch adapters are in turn connected to nodes which have terminals coupled thereto. Thus, the nodes are coupled to the input-output lines through the switch adapters. The method of this invention essentially comprises, first, establishing connections between pairs of input-output lines of the matrix. The input-output lines are each coupled to a network node. The second step of the method is grouping signals from the terminals coupled to each node and bound for the same input-output line into a frame with no frame containing signals originating from different nodes. The third and final step of this invention is transmitting the frames established at each node through the connections established between the input-output lines of the matrix. It is important to note that the transmission of these frames through corresponding pairs of closed crosspoints occurs at very high speeds, that is within 125 $\mu$sec. The signals transmitted above are preferably synchronous signals or signals that need to be circuit switched. Data signals, or asynchronous signals, on the other hand, are stored in respective data memories and transmitted only if there is enough time after all the necessary synchronous signals have been transmitted in a predetermined time interval.

Thus, this invention makes maximum utilization of the space switching matrix by grouping signals from the terminals of a given node and bound for the same input-output line of the matrix into a frame and space switching that frame as a unit. Since the signals from a given node are space switched in frames, rather than space switched from each terminal of the given node at a given time, the number of times that the crosspoints of the matrix must open and close is significantly reduced. Thus, the overall capacity of the switching system is increased, without a corresponding increase in cost.

DESCRIPTION OF THE PREFERRED EMBODIMENT

Figure 1:
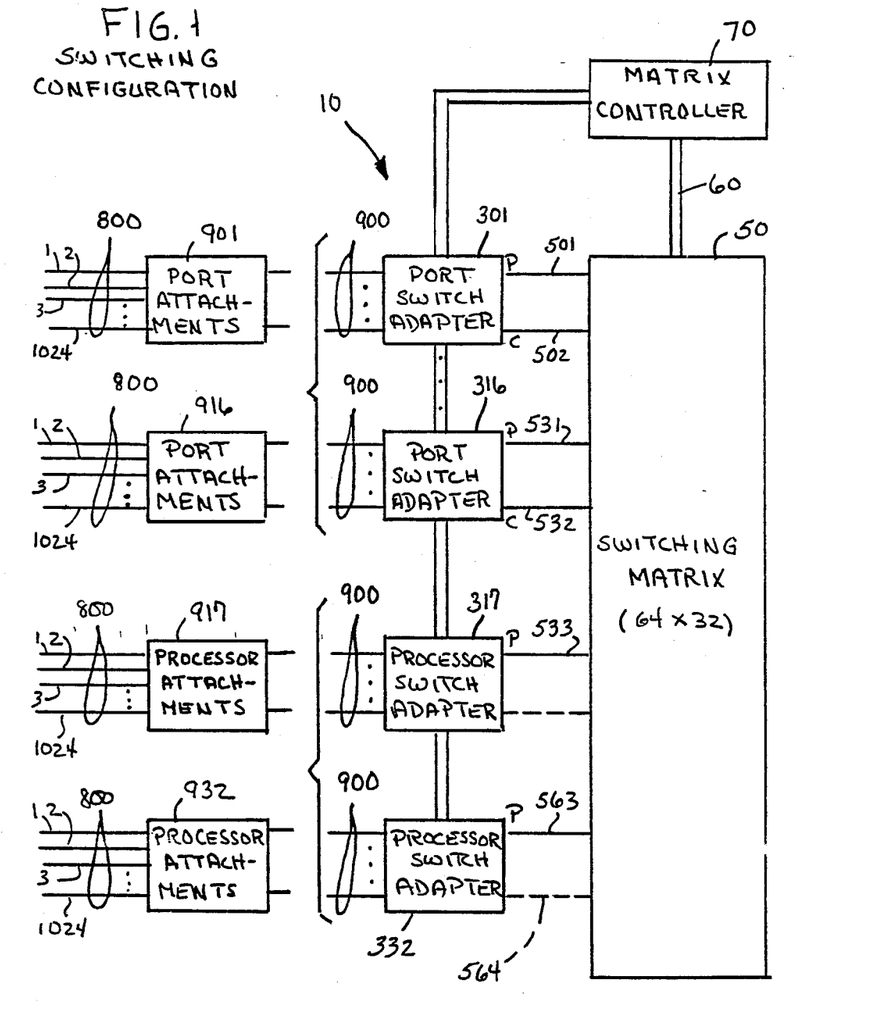
FIG. 1 is a schematic of the overall apparatus used in the preferred embodiment of this invention.

Referring now to the drawings, and more particularly to FIG. 1 there is shown an overall schematic of the apparatus used in the preferred embodiment of this invention. Shown in FIG. 1 are sixteen port attachments or nodes 901–916 and sixteen processor attachments or nodes 917–932. The port attachments merely attach to lines that receive both synchronous and asynchronous traffic. The term "port" refers to a communication port or line scanner. The processor attachments, on the other hand, are merely lines that connect to processors for carrying asynchronous traffic. The port attachments are coupled to the input-output lines 501–532 of the switching matrix 50 through the port switch adapters 301–316, the processor attachments are coupled to the input-output lines 533–564 of the switching matrix through the processor switch adapters 317–332. The port switch adapters are used to handle both voice and data. The processor switch adapters 317–332 are used to handle only data. A port/processor attachment is also referred to in this application as a node. The port/processor attachments are coupled to the switch adapters by buses 900. Each port/processor switch adapter can accommodate nodes of up to approximately 1,000 terminals. Each terminal could be connected to a data set or a telephone set. This embodiment uses 1024 terminals. The port switch adapters 301–316 are connected to the switching matrix 50 via input-output lines 501–532 which are dual lines for full duplex operation. The processor switch adapters 317–332 are connected to switching matrix 50 via the input-output lines 533–564 of the matrix, which lines are also dual lines for full duplex operation. The input-output lines for transmitting synchronous signals shall be referred to as circuit input-output lines, while input-output lines for the transmission of asynchronous signals shall be referred to as data input-output lines. Connections in switching matrix 50 are established by matrix controller 70. For maximum switching speed, a microprogrammed controller is preferred. The request for various connections in the switching matrix 50 are sent from the switch adapters 301–332 to the matrix controller in the form of a data request mask or circuit request mask. The switching configuration 10 will be used to implement a method of integral switching of voice and data as disclosed in this application.

The method described in this application provides for the integrated switching of both voice and data. The term "data", by itself, refers to signals such as bits that need not be transmitted synchronously.

Data can be stored and then forwarded for transmission without any severe timing constraints. Voice on the other hand must be transmitted synchronously. That is, voice must be received by a terminal at a given rate. For example, with voice, using 8-bit bytes per voice sample, a receiving terminal must receive (for typical digital voice transmission systems) 64 kbits every second. Whereas, with data, the same 64k bits could be delivered in spurts over perhaps several different time intervals over a period of several seconds. The switching of voice and data is referred to as circuit and packet switching, respectively. These terms are well known in the art.

Figure 2:
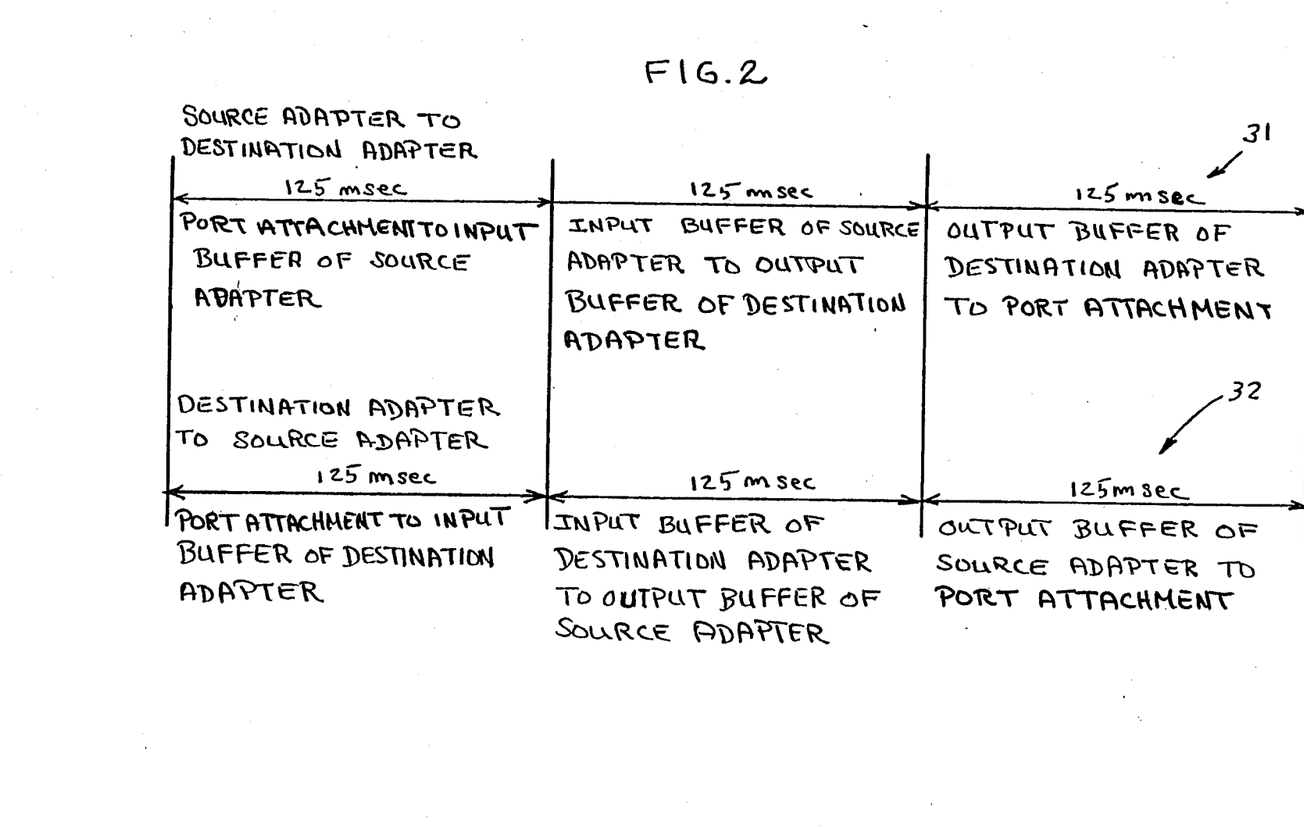
FIG. 2 is a time graph showing the time intervals used in this invention to transmit voice samples.

Shown in FIG. 2 is a schematic of the timing used in this invention for the switching of voice. The bandwidth of a voice signal is 4 khz. Thus, voice signals must be sampled 8000 times per second. FIG. 2 shows a time graph 31 divided into three 125 μsec ($\frac{1}{8}$ khz.) time periods. During the first time period of 125 μsec, voice samples are stored in one of a pair of input buffers of a port switch adapter. During the next 125 μsec interval, the voice samples are removed from the input buffer of each respective source adapter and stored in an output buffer of the respective destination adapter. During the third and final 125 μsec interval, the voice samples are removed from the output buffer of each respective destination adapter and sent to corresponding port attachment. Notice also that the voice samples in this example are also transmitted from the destination adapter to the source adapter in the same manner and in the same time periods as voice samples are transmitted from the source adapter to destination adapter. The foregoing description of transmitting in two directions at the same time is known as full duplex operation. See 32 of FIG. 2.

The terms source adapter and destination adapter refer to a requesting adapter and a requested adapter, respectively. That is, a requesting adapter requests a connection to a respective requested adapter.

If there is any time remaining in the 125 μsec interval during which the voice samples are transmitted, then data (the term "data" is defined above) will be transmitted in that interval, but only after the voice samples are transmitted.

Figure 3:
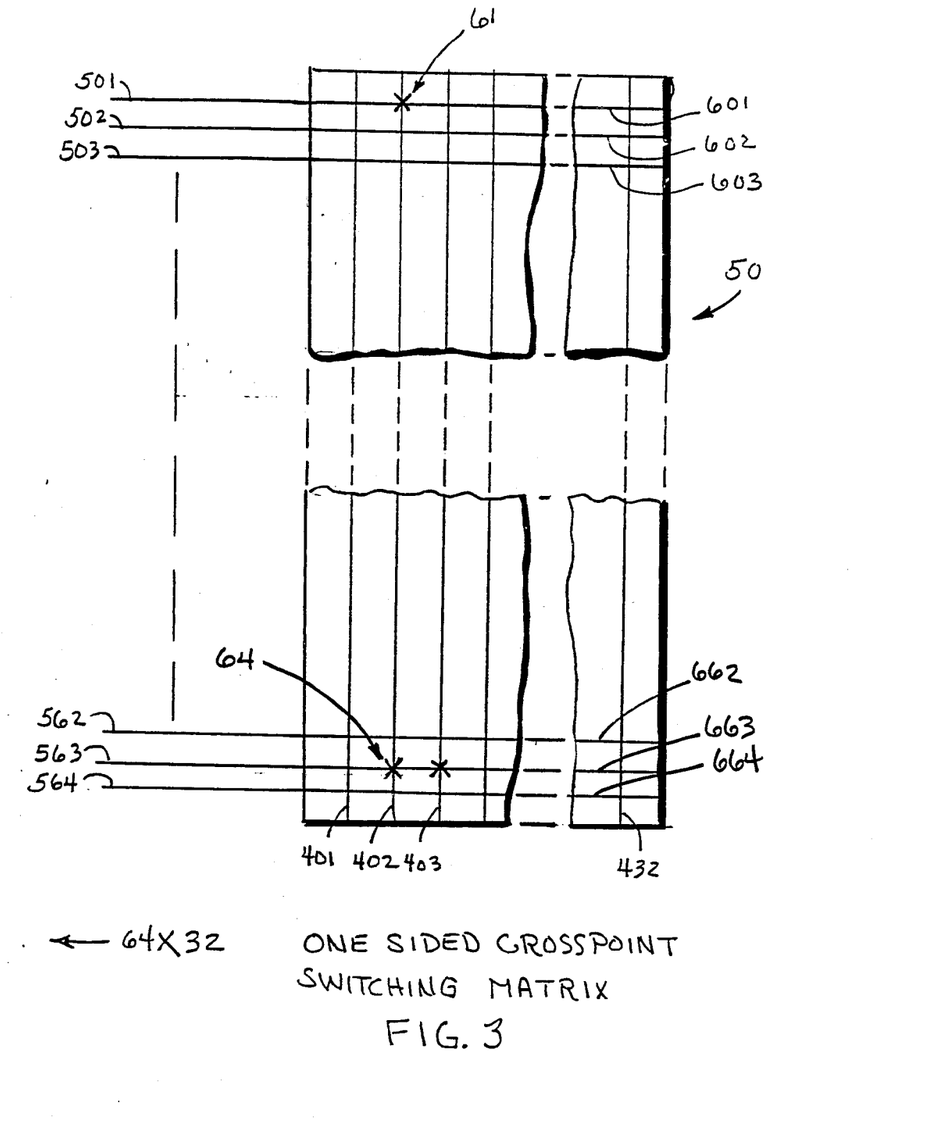
FIG. 3 is a schematic representation of the switching matrix used in the preferred embodiment of this invention.

Shown in FIG. 3 is a schematic of a 64×32 full-duplex, one-sided, high speed cross-point switching matrix 50, which switches 64 dual input-output lines 501–564. The input-output lines marked by P are data input-output lines, while the input-output lines marked by C are circuit input-output lines. In this preferred embodiment, 16 dual input-output lines are used for voice and 32 dual input-output lines are used for packet data. The remaining 16 dual input-output lines are not being used in this embodiment. The 16 input-output lines for voice are more specifically referred to as circuit input-output lines, while the 32 input-output lines for data can be more specifically referred to as data input-output lines. These dual input-output lines also form the dual row lines 601–664 of the switching matrix. The switching matrix also has internal dual column lines 401–432 which cross the dual row lines 601–664 without touching them. However, bi-directional or dual crosspoint switches, such as 61 or 64, are placed at the intersection of each row and column line. These crosspoint switches are thus used to interconnect input-output lines and hence the switch adapters. For example, input-output line 501 can be connected to input-output line 563 via column line 402 by closing cross-point switches 61 and 64. Since the input-output lines are connected to each other in pairs, only 32 sets of connections between the input-output lines are possible. Since there are 32 pairs of column lines available, this switch is non-blocking. However, not all requested connections between adapters may be established since one adapter may not be available, i.e., one adapter may be already receiving and transmitting signals to another adapter, other than the present requesting adapter. The switching matrix used in this embodiment is more fully described in U.S. Pat. No. 4,635,250 issued to C. J. Georgiou on Jan. 6, 1987.

A connection between one adapter and an available adapter is thus schematically illustrated in FIG. 3. Since each adapter in this embodiment is dedicated to a specific input-output line, one may say, alternatively, that a connection has been established between two input-output lines. Also, since each input-output line is coupled to a specific node, one may say that a connection has been between two nodes, or between a node and an input-output line.

The transmission of the circuit and packet data (synchronous and asynchronous signals) through the connections established by the cross-point switches under the direction of the controller 70 will now be described. The controller used in this embodiment is described in U.S. Pat. No. 4,630,045, entitled, "Controller for a Cross-Point Switching Matrix", which is herein incorporated by reference. Connections, as described above are used to establish connections from one adapter (a source adapter) to an available selected adapter (a destination adapter), or alternatively, as described above, a connection from one input-output line to another input-output line. These connections are made in response to a request for connections from a circuit request or data request mask from the node coupled to the source adapter. These masks will be more fully described below. When a connection is made in response to a request for connection, the request is said to be serviced. In any given adapter, requests for circuit switching during a given interval are serviced before requests for packet switching. The term "adapter" refers to a "port switch adapter", or a "processor switch adapter". The term "source adapter" refers to an adapter requesting service, while a "destination adapter" refers to an adapter requested for connection to a source adapter.

Figure 7:
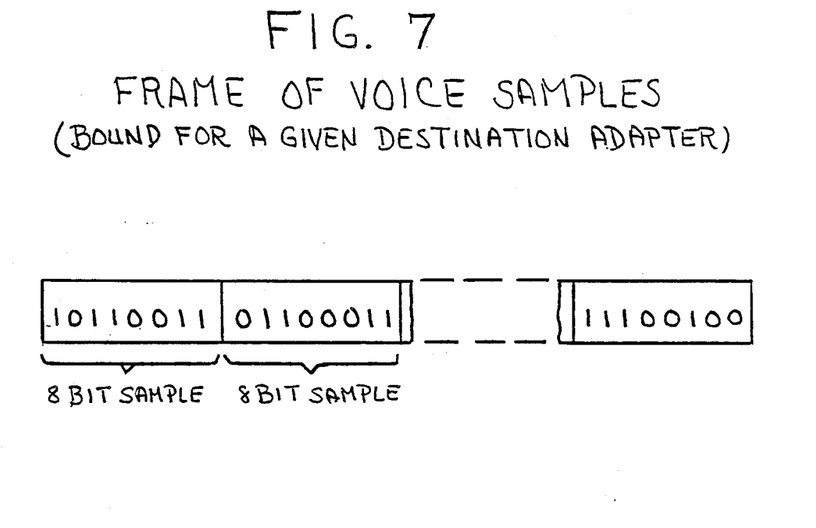
FIG. 7 is a schematic representation of a frame of voice samples bound for the same destination adapter.

Now suppose the source adapter has a request for both circuit and packet switching. In this case the adapter is a port switch adapter. A duplex connection is made to a destination adapter. Circuit data samples (typically voice samples of 8-bits per sample) are grouped into a frame (see FIG. 7) at both the source and destination adapter. The frame formed at the source adapter contains all the samples from that adapter bound for the destination adapter, and, similarly, the frame formed at the destination adapter contains all the samples from that adapter bound for the corresponding source adapter. Since the circuit data samples (synchronous signals) are from a node that is coupled to a respective source or destination adapter, the frame may be said to be formed of signals that are bound for the same node. The formation of these frames, before transmission, minimizes the number of connections that must be performed by the controller. Both frames, that is, the frames formed at the source and destination adapter above, are transmitted simultaneously between the two adapters, or equivalently, between the two nodes. Thus, full-duplex operation is achieved.

Once one set of connections for transmitting voice samples is established from a source adapter to/from a destination adapter, another set of connections for transmitting voice samples is subsequently established from another source adapter to/from a destination adapter and so on until connections have been established from every adapter requesting to transmit voice samples in a 125 μsec, interval. Respective voice samples are then transmitted immediately through the respective connections established. If there is any time remaining in the interval, similar connections can be established for asynchronous data stored in the respective packet memories, which data can then be transmitted to respective adapters. The process described above is then repeated for subsequent 125 μsec, intervals.

Figure 4:
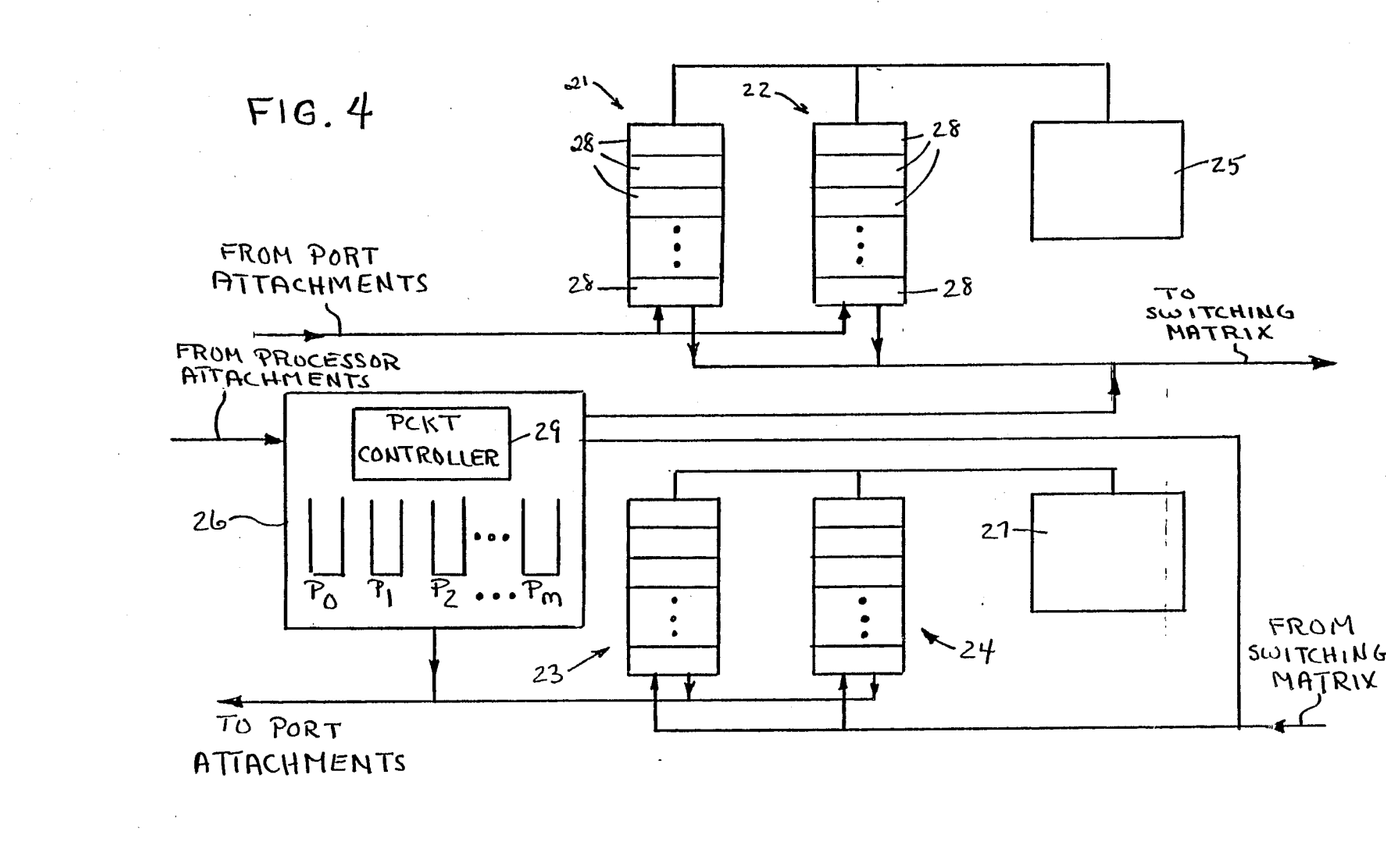
FIG. 4 is a schematic of a port switch adapter used in the preferred embodiment of this invention.

In FIG. 4, there is shown a schematic of the major components of a sample port switch adapter. This switch adapter basically comprises a pair of input buffers 21 and 22, a pair of output buffers 23 and 24, a packet memory 26, and routing devices 25 and 27. A processor switch on the other hand does not have flip-flop buffers, and its basic component is the packet memory. The routing devices each comprise two pointer tables and a series of registers and will be described below in the description of FIG. 5.

Referring again to FIG. 4, in this embodiment, the buffers above are flip-flop buffers, with each buffer capable of storing approximately one thousand bytes for servicing up to approximately one thousand terminals. The packet memory comprises a plurality of data memories Po . . . Pn and a packet controller 29. Each data memory is used to store data received from a set of terminals 800 through a bus 900. Each particular data memory (P3 for example) corresponds to a particular adapter (or data input-output line) to which the data stored in the particular memory is to be transmitted. The signals in each memory are thus asynchronous signals (data) which are bound for the corresponding adapter or data input-output lines coupled to the corresponding adapters. The packet controller is used to control the flow of data in and out of the data memories of the packet memory. This controller can be any standard microprocessor well known in the art. The routing devices 25 and 27 are used to contain information for routing the voice samples stored in each respective switch adapter. Voice from the terminals 900 are stored in one of the pair of input buffers, 21 or 22. The voice samples are stored in the respective input buffer every 125 μsec. Each voice sample is typically an eight bit binary word. The term switch adapter or adapter shall refer to either port switch adapter or processor switch adapters.

A processor switch adapter such as for example 317 is used only for the transmission of data and not for signals requiring synchronous transmission of such as voice. The basic component of the processor switch adapter is the packet memory 26 as described above. Data bound for a specific destination adapter is stored in a specified data memory of the packet memory. The data memory corresponds to the specific destination adapter, or equivalently, to a specific data input-output line. The details of the processor switch adapter are not shown here as they are well known to those skilled in the art.

A port switch adapter also serves as a time switch. The voice samples, stored in various rows (see 28 of FIG. 4) of the flip-flop buffers, are transmitted at different times through different connections established by the switching matrix. The voice samples that are bound for the same destination are grouped into a frame which is transmitted through connections of the switching matrix connecting two input-output lines, more specifically, in the case of synchronous transmission, circuit input-output lines. These frames are formed on the basis of information contained in the tables and registers of FIG. 5. The grouping of the voice samples to form a frame will be explained below.

Routing Device

Figure 5:
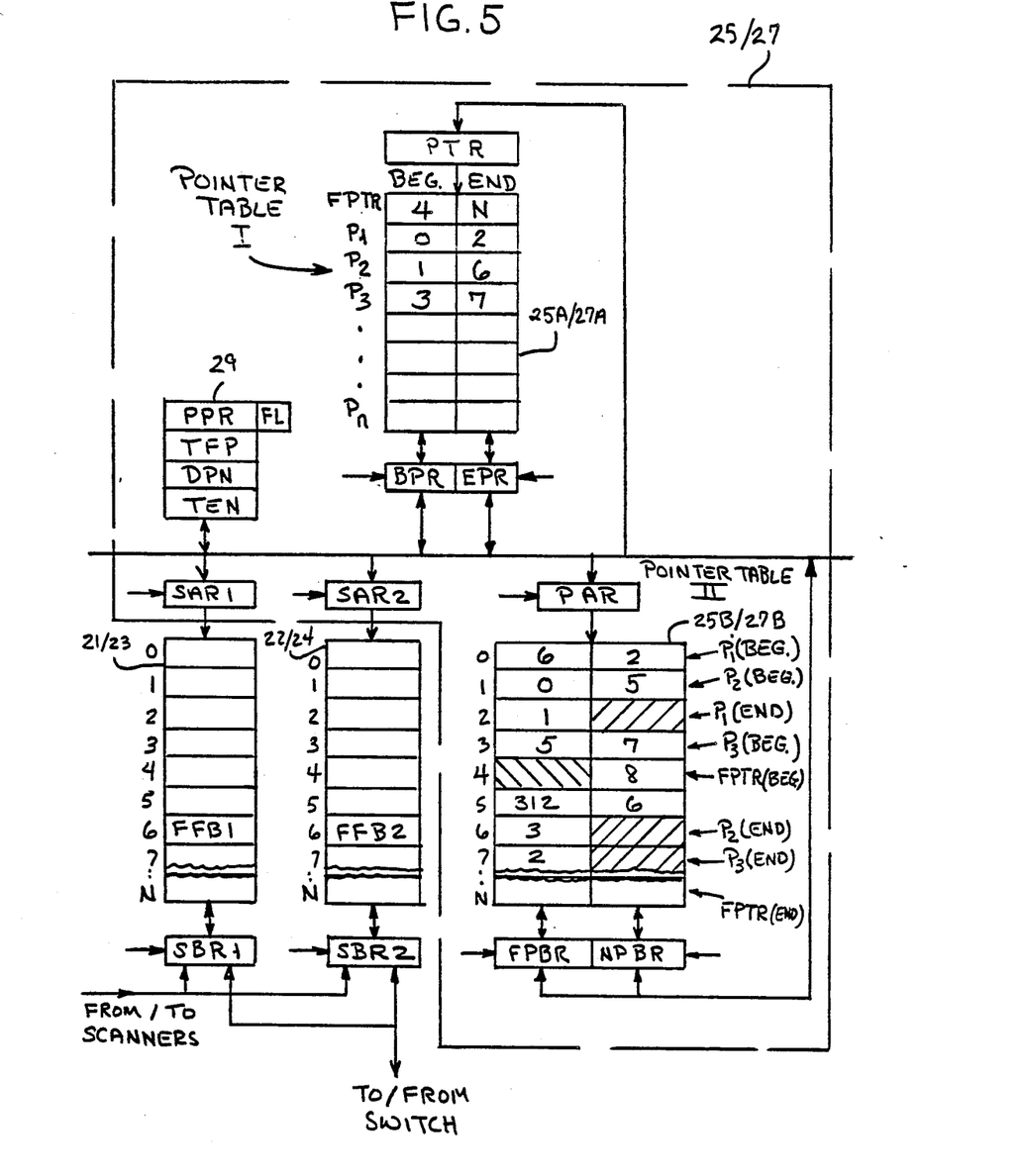
FIG. 5 is an overall schematic of the routing device of FIG. 4 that is used to group voice samples bound for the same destination.

Shown in FIG. 5 is a more detailed schematic of the routing device 25/27. A pair of associated input/output buffers 21/22 and 23/24 is also shown. Since both routing devices are the same and both pairs of buffers are the same, only one routing device and one pair of buffers are shown. Registers 29 (containing PPR, TFP, DPN, TEN and FL) will be described below.

Voice samples from terminals 800 connected to the respective switch adapter are stored in input buffer 21. When voice samples from the terminals are directed into input buffer 21, the counter SAR1 is set to zero. The counter then counts until the input buffer 21 is full. Then, voice samples from the terminals are directed into input buffer 22 and the counter SAR2 is set to zero. SAR2 then counts until input buffer 22 is full.

Pointer table I, 25A/27A, contains beginning and ending pointers into pointer table II, 25B/27B, which contains pointers into entries of the input/output buffers as well as pointers to another entry within pointer table II to identify entries of the buffers that are bound for the same destination adapter. Pointer PTR is used to point to entries in pointer table I while pointer PAR is used to point to entries in pointer table II.

Linked List

The grouping of voice samples into a frame bound for the same adapter, or equivalently, the same circuit input-output line is highly dependent on a term called a linked list which will now be defined.

A linked list is used to identify specific locations, such as rows, in a flip-flop buffer (input/output buffer) which contain voice samples that are bound for the same destination adapter, or circuit input-output line. Each row of the flip-flop buffers is used to store a voice sample bound for a specific destination port adapter. Each entry of the linked list contains a pointer (also referred to as an entry number) into a flip-flop buffer. Each entry of the linked list, except for the last entry, also contains a pointer into a pointer table. This latter pointer identifies the next location in the pointer table which has therein the next entry of the linked list. The last entry of the linked list need not have a pointer into the pointer table since there are no other linked list entries to point to. For a given linked list, all the entry numbers point to locations in the flip-flop buffer which have samples stored therein which are bound for the same destination adapter. Thus, a linked list serves to group together voice samples in an adapter which are bound for the same destination adapter. An example of a linked list can be seen in FIG. 5. For example, the linked list for destination port adapter 2 can be derived from pointer table I (25A/27A) and pointer table II (25B/27B). Referring to the P2 entry for switch adapter 2, pointer table I shows the number 1 and 6 which are the beginning and ending pointers into pointer table II. Thus, the linked list starts at entry 1 in pointer table II and ends at entry 6 in the same pointer table II. Going now to entry 1 of the pointer table II, ones sees the numbers 0 and 5 in the left and right columns, respectively. The 0 refers to an entry, or row, in the input/output buffer 21/23 that contains a voice sample that is bound for (that is, to be transmitted to) port adapter number 2, for example port adapter 302. The 5 refers to entry 5 in pointer table II which entry contains a pointer into a specific entry of the input buffer/output buffer 21/22 that again contains a voice sample bound for port adapter number 2. Looking to entry 5 of pointer table II, one finds the number 312 which means that the voice sample entry 312 in the input/output buffer is also bound for port adapter number 2.

As above, the number 6 in the right column of entry 5 points to entry 6 of pointer table II indicating that entry 6 also contains a number of an input/output buffer entry that has a voice sample bound for port adapter number 2. The hashed lines in the right column of entry 6 of pointer table II indicate a nil or equivalently that we have come to the end of the linked list. Thus, this linked list points to all entries in the input/output buffer that contain voice samples that are bound for port adapter number 2. These entries are 0, 312 and 3.

Transmission of Frame to Destination Port Adapter

Figure 6:
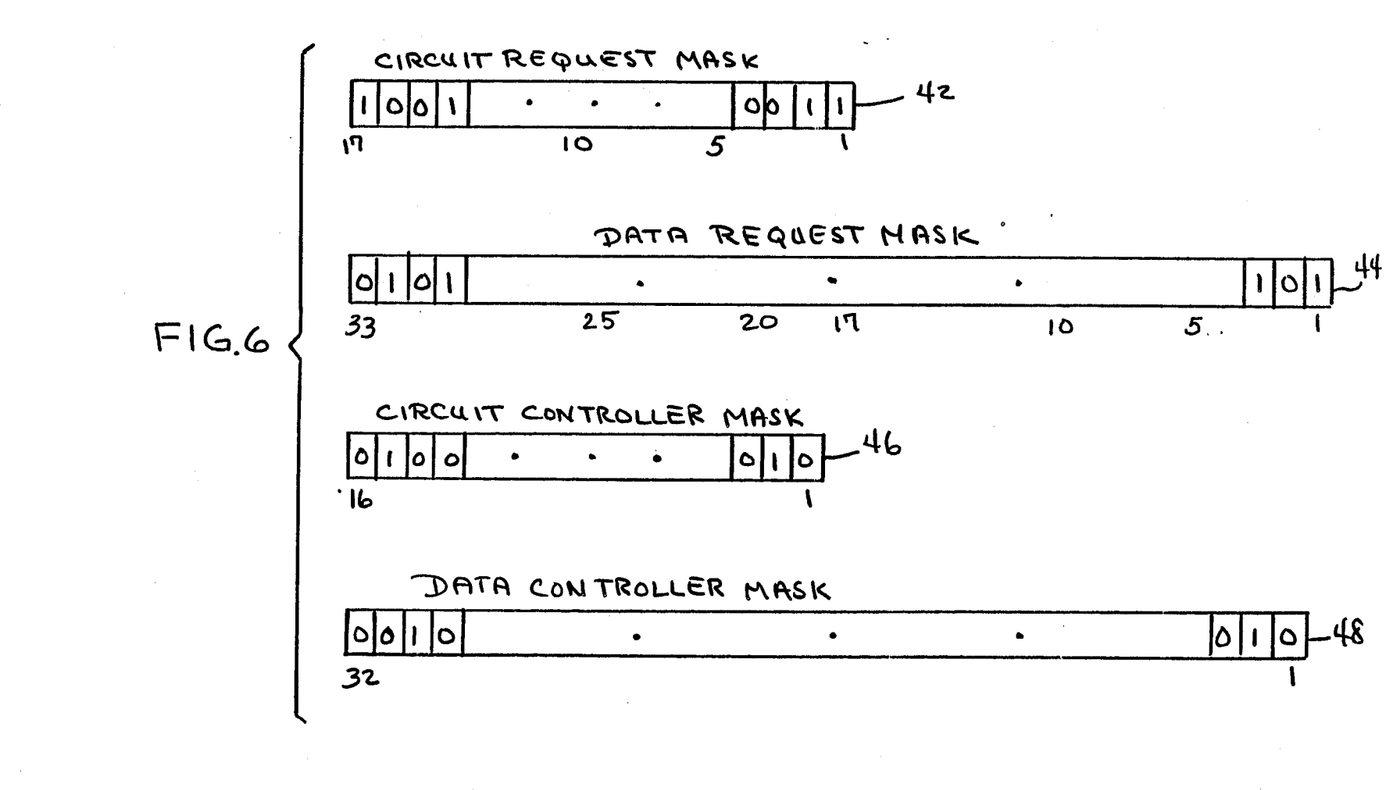
FIG. 6 is a schematic representation of the data request mask, circuit request mask, and controller mask.

Assuming input buffer 21/23 is full and that a connection has been made to the requested destination port adapter stored in the DPN (Destination Port Number) register. The transmission of a frame from an input buffer of a requesting adapter to an output buffer of the requested adapter will now be described. The term "frame" is described more fully in the description of FIG. 6 below.

Suppose, for example, that a request is made for a connection to port adapter number 1, which for example, could be port adapter 901. The 1 is transferred from DPN to PTR. PTR then accesses the entry in pointer table I corresponding to port adapter number 1. The contents of this entry (0,2) in pointer table I are then stored in the BPR and EPR registers shown. The 0 is stored in BPR register while the 2 is stored in the EPR register. The contents of BPR (0) are then transferred to PAR which points to entry 0 in pointer table II. The contents of this latter entry (6,2) are then transferred to registers FPBR and NPBR with 6 in register FPBR and 2 in NPBR. The 6 represents a specific entry or row of the input buffer while the 2 represents another entry in pointer table II. The contents of FPBR (6) are stored in the SAR1 register, while the contents of NPBR (2) are stored in PAR. SAR1 then accesses the 6th entry of the input buffer and stores the contents of that 6th entry into SBR1. The contents of SBR1, which are the actual voice samples, will eventually be transmitted to destination port adapter number 1, that is 301 in FIG. 1. Concurrently with the accessing of the input buffer, entry 2 (stored in PAR) of pointer table II is accessed. The contents of the accessed entry of pointer table II are stored into FPBR and NPBR as above. The contents of FPBR and the contents of NPBR are then transferred to SAR1 and PAR, respectively. Then the contents of SAR1 are used to access a particular entry of the input buffer, while the contents of PAR are used to access a particular entry of pointer table II. The above is repeated until a nil is fetched from pointer table II and is stored in NPBR.

Finally, the last accessed entry of the input buffer is stored in SBR1 and is transmitted to one of the output buffers of destination port adapter number one. Thus, all voice samples bound for the same destination adapter have been grouped together. A frame (see below) is thus formed and transmitted to the destination adapter number 1. A new request from the mask (see below) is sent to DPN and the above processing of grouping voice samples bound for the same destination adapter, indicated by the contents of DPN, is repeated.

It should also be noted that while one of the input buffers is having voice samples transmitted to the switching matrix, the second input buffer is having voice samples stored therein. When the one input buffer finishes having its entries transmitted to available switch adapters, it then has voice samples stored therein while the second input buffer has voice samples transmitted to available switch adapters. Thus, the two input buffers operate in flip-flop fashion alternately having voice samples transmitted and stored, that is, while one input buffer is being stored with voice samples, the other is having its contents transmitted through the switching matrix to a respective destination adapter.

Establishing a New Call

Again referring to FIG. 5, the process of adding a new entry into a flip-flop buffer will now be explained. This addition of a new entry would correspond to the case of when a new telephone call is established and an input buffer entry previously unused is now being used for the new telephone call. Assume the call is directed to port switch adapter number 2 (for example 302) and the entry number in the input buffer is 215. The value 2 is stored in DPN and 215 is stored in register TEN (Temporary Entry Number) register. The following steps are then taken. PTR is set to 0 to access the pointer entry (FPTR) of pointer table I that points to the beginning of the free entries linked list (see below) in pointer table II. The contents of the FPTR entry (4,N) are placed into BPR and EPR, with 4 into BPR and N into EPR. The 4 in BPR is then transferred to PAR and into the TFP (Temporary Free Pointer) register. Entry 4 of pointer table II is accessed loading 8 into NBPR. The 8 in NBPR is then transferred to BPR. The value of the pointer to the beginning of the free entries is updated by writing the contents of BPR(8) into entry 0 (i.e., FPTR) of pointer table I. The contents of the FPTR entry are now (8,N) since 4 is no longer the beginning of the free entries in pointer table II. The contents of DPN (2) are then transferred to PTR. The contents of entry 2 in pointer table I (1,6) are then entered into BPR and EPR as above. At the same time the contents of TFP (4) is transferred to NBPR. Then the contents of EPR (6) are transferred into PAR which in turn is used to select entry 6 of pointer table II. The contents of NBPR (4) are then written into entry 6. The contents of TFP (4) are transferred into PAR and into EPR, and the contents of TEN (215) are transferred into FPBR. NPBR is set to nil. The contents of FPBR (215) and of NPBR (nil) are written into entry 4 of pointer table II. Concurrently, the contents of EPR (4) are placed into entry P2 of pointer table I.

Terminating a Call

Again referring to FIG. 5, the process of deleting an entry from an input buffer will now be described. This deletion is used for the case of a telephone call having ended. Assume that the call used entry 5 of the input buffer and was directed to switch port adapter number 3 (that is 903). The following steps are followed. The contents of DPN (3) are transferred into PTR and entry P3 of pointer table I is accessed loading (3,7) in BPR and EPR with 3 in BPR and 7 in EPR.

The contents of BPR (3) are transferred into PAR, TFP and PPR (Previous Pointer Register). FL (flag) is set indicating PPR was loaded from pointer table I. Entry 3 of pointer table II is accessed loading 5 into FPBR and 7 into NPBR. The contents of FPBR (5) are compared with the contents of TEN (5).

If the contents FPBR and TEN were different, the contents of TFP would be transferred into PPR and the flag would be cleared. The contents of NPBR would then be transferred into PAR and TFP. Pointer table II would again be accessed using the new value stored in PAR wherein entry corresponding to the new value stored in PAR would be stored in FPBR and NPBR as above. The contents of FPBR would again be compared with TEN. Pointer table II would continue to be accessed as above using the contents of PAR obtained from NPBR as described above until the contents of FPBR equals the contents of TEN.

In the example of this embodiment a match was found between the contents of FPBR (5) and TEN (5) after the first accessed entry of pointer table II. Thus, the flag (FL) was never cleared. The first step after a match has been obtained is to test the flag. If the flag is still set, the contents of NPBR (7) are transferred into register BPR. The contents of BPR are then written into the port 3 (P3) entry of pointer table I. Since the flag was still set, the flip-flop buffer entry number (5) that is no longer being used is at the beginning of the linked list in pointer table II. Thus, in pointer table I, the beginning pointer for the above linked list in pointer table II is now 7 instead of 3.

On the other hand, if the flag is not cleared, the flip-flop buffer entry number that would be deleted from pointer table II is not the beginning of the linked list. When the flag is clear (not set) and a match between FPBR and TEN has been made, the following steps are taken. The contents of TFP are transferred into PAR and pointer table II is accessed loading NPBR which now points to the deleted entry in pointer table II. Then, the contents of PPR are transferred into PAR and the contents of NPBR are loaded into the entry of pointer table II accessed by the contents of PAR (PPR). The previous step closes the gap between the entries in the link list before and after the deleted entry in the linked list in pointer table II.

Now the deleted pointer table II entry is used to change the free entry pointer in the FPTR entry of pointer table I in the following steps. PTR is set to 0, and the FPTR entry of pointer table I is accessed to load BPR (4) and EPR (N). N is then transferred into PAR. The contents of TFP (3) is transferred into NPBR and into EPR. The contents of NPBR are written into entry N of pointer table II and the contents of EPR into entry FPTR. Thus, the deleted entry is added to the linked list of free pointers in pointer table II. The contents of TFP (3) are transferred to PAR and NPBR is set to nil. The contents of NPBR (nil) are then written in entry 3 (accessed via PAR) of pointer table II.

All steps described in the above sequences for the formation and transmission of frames, and establishing and terminating calls, are executed under microprogram control.

Requests for connections to the input-output lines or selected adapters are usually in the form of a request mask. If the mask contains a request for connections for the transmission of synchronous data, the mask is known as a circuit request mask, otherwise, the mask containing requests for connections is known as a data request mask. As can be seen from FIG. 6, the circuit request mask 42 contains 17 bit positions. Each of 16 of the bit positions represents a request for connection to a specific port adapter or input-output line. A "1" in the 17th position indicates that circuit switching is being requested. If the requesting port adapter also has packet switching request, a data request mask 44 containing 33 bit positions is also sent from the adapter to the controller. Each of 32 of the bit positions represents a request for connection to a specific port or processor adapter. The "0" in the 33rd bit position represents that the requests are for packet switching. The request mask (circuit or data) is then compared with a controller mask 46 or 44 which indicates which adapters are available. The circuit controller mask 46 indicates which port switch adapters or circuit input-output lines are available, while the data controller mask 48 indicates which data input-output lines or processor switch adapters are available. Either a "0" or "1" could be used in a given slot position of a controller mask to indicate that a respective input-output line (or adapter) corresponding to that slot position is available.

Disconnection requests can occur either by raising a flag to the controller, or by combining them with a connection request to another adapter. Another possible implementation is to send the request mask to the controller only once, at the beginning of a 125 microsec servicing period. Then, when the controller receives disconnection requests, it simply deletes from the mask the adapters being serviced.

Figure 8:
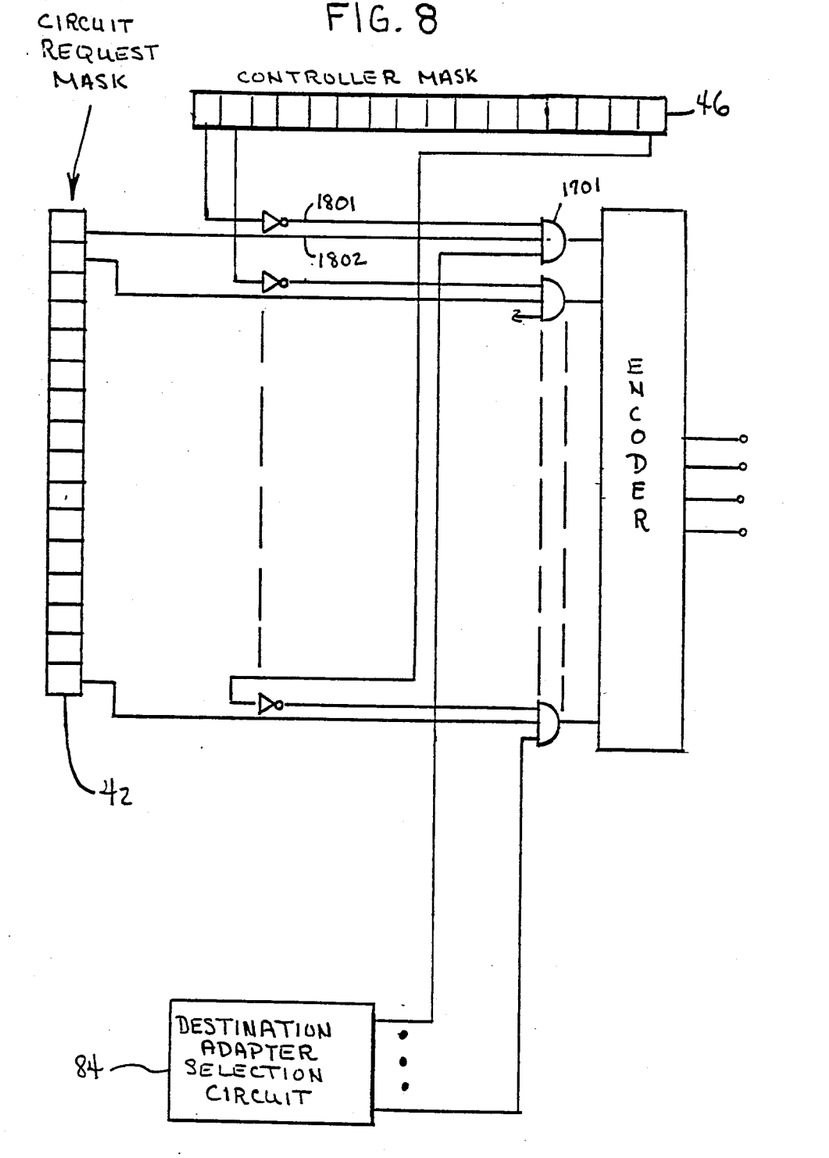
FIG. 8 is a schematic representation of the circuit used to select an available adapter or input-output line from a number of adapters requested in a request mask.

Shown in FIG. 8 is the circuit, which is part of the controller, used to generate the address of a requested available adapter. A circuit controller mask 46 and a circuit request mask 42 are shown here for convenience. A data controller mask and a data request mask could also have been shown.

Each slot position of the circuit request mask 42 is applied to one of two inputs of a respective AND gate such as 1701. The other input of the respective AND gate comes from an output of an inverter whose input is a corresponding slot position of the controller mask 46. For example, see lines 1801 and 1802 which are inputs to AND gate 1701. A "1" in the slot position 1 of the circuit request mask indicates that a request is being made for connection to a requested adapter, say for example 301, and a "0" in the corresponding slot position of the controller mask indicates that the requested, or selected, adapter is not busy. In this situation, the output of AND gate 1701 would be a "1" indicating that adapter 301 has been requested for connection and is available for use. The destination adapter selection circuit serves to arbitrate, at any given time, which one of several requests in the request masks will be compared with the corresponding slot position in the controller mask. The destination adapter selection circuit 84 is usually part of the controller 70 shown in FIG. 1. The output of the encoder then generates an address of the respective available (not busy) requested adapter. The controller then closes appropriate crosspoint to establish connections to the requested adapter.

It is, of course, to be understood that while the preferred embodiment of this invention referred to voice and data, this invention could easily be expanded to include integrated synchronous and asynchronous signals. Synchronous signals, of which voice is an example, must be transmitted within designated time slots. The term data as used in this application refers to asynchronous signals.

Having thus described our invention, what we claim as new and desire to secure by Letters Patent is:

1. In a communications switching system having a switching matrix having an array of crosspoints to interconnect circuit and data input-output lines of the matrix, the system also having a plurality of network nodes each coupled to one of the input-output lines, each node also receiving signals being sent from terminals coupled thereto, said signals sent to said each node, being bound for a plurality of input-output lines of said matrix, a method of switching signals through the matrix from said nodes, comprising the steps of:

(a) sending at least one request mask to the controller of the switching matrix from each of the nodes, each mask being either a circuit request mask or a data request mask, each circuit request mask or data request mask containing requests for connections to respective selected circuit or data input-output lines, respectively;

(b) selecting one circuit mask, sent from one of the nodes, from circuit masks sent to the controller in step (a);

(c) establishing connections from one of said circuit input-output lines coupled to said one of the nodes of step (b), through the switching matrix, to one of the respective selected circuit input-output lines of the matrix requested in the circuit request mask selected in step (b);

(d) grouping synchronous signals (of said signals) bound for said one of the selected circuit input-output lines, of step (c), into a frame;

(e) transmitting the frame of step (d) through the connections established in step (c);

(f) repeating steps (b) and (c) after each establishment of connections as in step (c), but selecting as in step (b) with each repetition of this step (that is step (f)), any one of the circuit masks sent to the controller in step (a) from nodes not currently transmitting synchronous signals to respective circuit input-output lines of the matrix, this step (that is step (f)), along with all repetitions thereof, being performed within a predetermined time interval;

(g) repeating steps (d) and (e) immediately after, the establishment of each set of respective connections in steps (c) and (f), this step being repeated within said predetermined time interval until the frames formed in step (e) and this step have been transmitted, this step being repeated so that frames from several of the nodes may be transmitted to respective selected input-output lines at the same time;

(h) selecting one data request mask from said data request masks sent to the controller in step (a) from one of the nodes, after said circuit request masks have been selected as in steps (b) and (f);

(i) establishing connections: from one of said data input-output lines coupled to said one of the nodes of step (h), though the switching matrix, to one of the respective data input-output lines of the matrix requested in the data request mask selected in step (h);

(j) transmitting asynchronous signals of said signals from said one node of steps (h) and (i) through the connections established in step (i); and (k) repeating steps (h), (i) and (j) after each establishment of connections as in step (i), but selecting as in step (h), with each repetition of this step, any one of the data request masks sent to the controller in step (a) from nodes not currently transmitting asynchronous signals to respective data input-output lines, this step being repeated so that asynchronous signals from several nodes may be transmitted to respective selected outputs at the same time, and this step, along with all repetitions thereof, being performed within said predetermined time interval, but after all connections in response to circuit request masks have been established as in steps (c) and (f).

2. A method as recited in claim 1 wherein the synchronous signals are binary digital signals representing voice samples.

3. A method as recited in claim 1, further comprising the steps of:

storing the synchronous signals in rows of an input buffer before grouping the synchronous signals as in step (d) of claim 6; and storing the asynchronous signals (referred to in step (j) of claim 6) in respective data memories with each of said data memories corresponding to a respective data input-output line, the asynchronous signals being stored before transmitting the asynchronous signals as in step (j) of claim 6.

4. A method as recited in claim 1, further comprising the step of:

comparing each said request mask of step (a) of claim 6 with a controller mask indicating which input-output lines are available for the transmission of said signals, the controller mask being either a circuit controller mask or a data controller mask, the circuit controller mask indicating which circuit input-output lines are available for transmission of synchronous signals, and the data controller mask indicating which data input-output lines are available for transmission of asynchronous signals.

5. A method as recited in claim 1, wherein the connections established in steps (c), (i) and in all repetitions of steps (c) and (i), are dual connections, wherein signals are transmitted in both directions on the dual connections, wherein synchronous signals to be transmitted on each of the dual connections established are grouped into two frames, one frame being for signals being transmitted in one direction of transmission and the other frame being transmitted in the other direction of transmission with the two frames being transmitted at approximately the same time over each of the dual connections established.

* * * * *